US012737205B2

(12) United States Patent
Diaz-Cuellar et al.

(10) Patent No.: US 12,737,205 B2
(45) Date of Patent: Sep. 15, 2026

(54) COMPUTER DEVICE INCLUDING PROCESS ISOLATED CONTAINERS WITH ASSIGNED VIRTUAL FUNCTIONS

(71) Applicant: Microsoft Technology Licensing, LLC, Redmond, WA (US)

(72) Inventors: Gerardo Diaz-Cuellar, Redmond, WA (US); Omar Cardona, Redmond, WA (US); Dinesh Kumar Govindasamy, Redmond, WA (US); Jason Messer, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 837 days.

(21) Appl. No.: 17/628,153

(22) PCT Filed: Aug. 25, 2020

(86) PCT No.: PCT/US2020/047830

§ 371 (c)(1),
(2) Date: Jan. 18, 2022

(87) PCT Pub. No.: WO2021/041431

PCT Pub. Date: Mar. 4, 2021

(65) Prior Publication Data

US 2022/0276886 A1 Sep. 1, 2022

(30) Foreign Application Priority Data

Aug. 26, 2019 (LU) ........................................ 101362

(51) Int. Cl.
*G06F 9/455* (2018.01)
*H04L 9/40* (2022.01)

(52) U.S. Cl.
CPC ...... *G06F 9/45533* (2013.01); *H04L 63/0272* (2013.01)

(58) Field of Classification Search
None
See application file for complete search history.

(56) References Cited

U.S. PATENT DOCUMENTS 9,176,767 B2 11/2015 Cantu
9,979,639 B2 5/2018 Sunavala et al.
(Continued)

OTHER PUBLICATIONS

Yun-Chen Li and Mei-Ling Chiang, "LyraNET: a zero-copy TCP/IP protocol stack for embedded operating systems," 11th IEEE International Conference on Embedded and Real-Time Computing Systems and Applications (RTCSA'05), Hong Kong, China, 2005 , pp. 123-128, doi: 10.1109/RTCSA.2005.57. (Year: 2005).*
(Continued)

*Primary Examiner* — Frank D Mills
(74) *Attorney, Agent, or Firm* — Newport IP, LLC; Jacob P. Rohwer

(57) ABSTRACT

Examples described herein generally relate to a server for hosting process isolated containers within a virtual machine. The server includes at least one physical processor; at least one physical computer memory storing executable code for execution by the at least one physical processor, and a physical network interface controller, NIC. The executable code may be configured to provide a host virtual machine and at least one process isolated container within the host virtual machine. The physical NIC includes a physical NIC switch configured to distribute incoming data packets to a plurality of functions including a physical function and virtual functions. At least one of the virtual functions is assigned to an individual process isolated container within the virtual machine. The virtual function assigned to the individual process isolated container allows the physical
(Continued)

NIC switch to distribute incoming data packets for the individual process isolated container at a hardware level.

17 Claims, 5 Drawing Sheets

(56) References Cited

U.S. PATENT DOCUMENTS

| | | | | |
|---|---|---|---|---|
| 10,261,814 | B2 | 4/2019 | Cooper et al. | |
| 10,719,369 | B1 * | 7/2020 | Aithal | H04L 63/0263 |
| 10,999,219 | B1 * | 5/2021 | Athreyapurapu | H04L 41/0806 |
| 2010/0223613 | A1 | 9/2010 | Schneider | |
| 2012/0002535 | A1 | 1/2012 | Droux et al. | |
| 2012/0005521 | A1 | 1/2012 | Droux et al. | |
| 2012/0033673 | A1 * | 2/2012 | Goel | G06F 9/5077 370/400 |
| 2015/0370586 | A1 * | 12/2015 | Cooper | G06F 12/0223 718/1 |
| 2015/0381495 | A1 | 12/2015 | Cherian et al. | |
| 2016/0342437 | A1 | 11/2016 | Khemani et al. | |
| 2016/0350151 | A1 | 12/2016 | Zou et al. | |
| 2017/0170990 | A1 | 6/2017 | Gaddehosur et al. | |
| 2018/0027079 | A1 * | 1/2018 | Ben Ali | H04L 67/141 709/216 |
| 2019/0026154 | A1 * | 1/2019 | Desai | G06F 9/4856 |
| 2019/0394219 | A1 * | 12/2019 | Huang | H04L 63/1425 |
| 2020/0021518 | A1 * | 1/2020 | Yan | H04L 49/70 |
| 2020/0351286 | A1 * | 11/2020 | Ahuja | H04L 43/028 |
| 2020/0394048 | A1 * | 12/2020 | Chen | G06F 9/4406 |
| 2020/0403940 | A1 * | 12/2020 | Daly | H04L 49/70 |
| 2022/0272039 | A1 * | 8/2022 | Cardona | H04L 45/566 |
| 2022/0276886 | A1 * | 9/2022 | Diaz-Cuellar | H04L 63/0272 |

OTHER PUBLICATIONS

Boeuf, Sebastien, "Kata Containers: The Way to Run Virtualized Containers", Retrieved from: https://www.openstack.org/summit/vancouver-2018/summit-schedule/events/20708/kata-containers-the-way-to-run-virtualized-containers, May 21, 2018, 4 Pages.

Lohr, et al., "About Windows containers", Retrieved from: http://web.archive.org/web/20190528230404/https://docs.microsoft.com/en-us/virtualization/windowscontainers/about/, May 22, 2019, 9 Pages.

Chris, K, "Lightweight Windows containers: Using Docker process isolation in Windows 10", Retrieved from: https://poweruser.blog/lightweight-windows-containers-using-docker-process-isolation-in-windows-10-62519be76c8c, Jan. 14, 2019, 6 Pages.

Firestone, Daniel, "VFP: A Virtual Switch Platform for Host SDN in the Public Cloud", In Proceedings of 14th USENIX Symposium on Networked Systems Design and Implementation, Mar. 27, 2017, pp. 315-328.

Hu, Jiayu, "Accelerate Container Networking with Data Plane Development Kit (DPDK)", Retrieved from: https://www.intel.com/content/www/us/en/developer/articles/technical/accelerate-container-networking-with-dpdk.html, Oct. 22, 2018, 4 Pages.

"Search Report and Written Opinion Issued in Luxembourg Patent Application No. LU101362", Mailed Date: May 15, 2020, 10 Pages.

Hudek, et al., "RSS Hashing Types", Retrieved from: http://web.archive.org/web/20180218125410/https://docs.microsoft.com/en-us/windows-hardware/drivers/network/rss-hashing-types, Apr. 20, 2017, 7 Pages.

"International Search Report and Written Opinion Issued in PCT Application No. PCT/US2020/047830", Mailed Date: Oct. 27, 2020, 15 Pages.

Poggemeyer, et al., "What's new in Hyper-V on Windows Server", Retrieved from: http://web.archive.org/web/20171028094117/https://docs.microsoft.com/en-us/windows-server/virtualization/hyper-v/what-s-new-in-hyper-v-on-windows, Sep. 21, 2017, 12 Pages.

Schott, et al., "Windows Container Networking", Retrieved From: http://web.archive.org/web/20190603152351/https://docs.microsoft.com/en-us/virtualization/windowscontainers/container-networking/architecture, Mar. 27, 2018, 4 Pages.

Hudek, Ted, "Overview of Single Root I/O Virtualization (SR-IOV)", Retrieved from: http://web.archive.org/web/20170630225759/https://docs.microsoft.com/en-us/windows-hardware/drivers/network/overview-of-single-root-i-o-virtualization--sr-iov-, Apr. 20, 2017, 1 Page.

Hudek, et al., "Receive Side Scaling", Retrieved from: http://web.archive.org/web/20180218093127/https://docs.microsoft.com/en-us/windows-hardware/drivers/network/ndis-receive-side-scaling2, Apr. 20, 2017, 2 Pages.

Macmichael, Duncan, "Virtual Machine Queue (VMQ) Overview", Retrieved from: https://web.archive.org/web/20190421033637/https://docs.microsoft.com/en-us/windows-hardware/drivers/network/virtual-machine-queue--vmq-, Apr. 20, 2017, 1 Page.

Cooley, et al., "Hyper-V Containers", Retrieved from: http://web.archive.org/web/20190121112629/https://docs.microsoft.com/en-us/virtualization/windowscontainers/manage-containers/hyperv-container, Sep. 13, 2018, 3 Pages.

International Search Report and Written Opinion issued in corresponding International Application No. PCT/US2020/047830 dated Mar. 25, 2021.

"Notice of Allowance Issued in European Patent Application No. 20768201.4", Mailed Date: Oct. 13, 2023, 8 Pages.

Decision to grant for European Application No. 20768201.4, mailed on Nov. 3, 2023, 02 pages.

"Notice of Allowance Issued in European Patent Application No. 20768201.4", Mailed Date: May 26, 2023, 8 Pages.

Cooley, et al., "Hyper-V isolation", Retrieved from https://learn.microsoft.com/en-us/virtualization/windowscontainers/manage-containers/hyperv-container, Sep. 13, 2018, 5 Pages.

* cited by examiner

COMPUTER DEVICE INCLUDING PROCESS ISOLATED CONTAINERS WITH ASSIGNED VIRTUAL FUNCTIONS

This application is a 35 U.S.C. § 371 National Phase of PCT Application No. PCT/US2020/047830, titled "COMPUTER DEVICE INCLUDING PROCESS ISOLATED CONTAINERS WITH ASSIGNED VIRTUAL FUNCTIONS," filed Aug. 25, 2020, which claims priority to Luxembourg Application No. LU101362, titled "COMPUTER DEVICE INCLUDING PROCESS ISOLATED CONTAINERS WITH ASSIGNED VIRTUAL FUNCTIONS," filed Aug. 26, 2019, both of which are assigned to the assignee hereof, and incorporated herein by reference in their entirety.

BACKGROUND

The present disclosure relates to computer virtualization, and more particularly to containers within a virtualized server.

Cloud services provide virtual machines (VMs) for customers to execute various applications. The virtual machines execute on a hardware server. Multiple virtual machines execute on the same hardware server. Containers are used to isolate different processes. Virtualization of the computer hardware allows efficient use of resources such as physical processors and physical memory. That is, resources are assigned to processes as needed and are shared between different processes.

A virtual machine adds overhead to lower layer (e.g., layer 1 and layer 2) packet routing. Because multiple addressable processes are executing on the same physical machine, each in a separate container, a virtual machine uses a software switching mechanism (e.g., a virtual switch) to route packets to specific containers. A virtual switch, however, consumes processor cycles and reduces the processor cycles available for executing the processes within the containers and also contributes to latency.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

In an example, the disclosure provides a server for hosting process isolated containers within a virtual machine. The server includes at least one physical processor. The server includes at least one physical computer memory storing executable code for execution by the at least one physical processor. The executable code is configured to provide a host virtual machine and at least one process isolated container within the host virtual machine. The server includes a physical network interface controller, NIC, including a physical NIC switch configured to distribute incoming data packets to a plurality of functions. The plurality of functions include a physical function and virtual functions, a respective virtual function of the virtual functions is assigned to an individual process isolated container within the virtual machine.

In another aspect, the disclosure provides a method of hosting process isolated containers within a virtual machine. The method includes instantiating, on a server including a processor, a host virtual machine and at least one process isolated container within the host virtual machine. The method includes distributing incoming data packets to a plurality of functions via a physical network interface controller, NIC, including a physical NIC switch. The plurality of functions include a physical function and virtual functions. A respective virtual function of the virtual functions is assigned to an individual process isolated container of the at least one process isolated container within the virtual machine.

In another aspect, the disclosure provides a non-transitory computer-readable medium storing computer executable instructions for performing the above method.

Additional advantages and novel features relating to implementations of the present disclosure will be set forth in part in the description that follows, and in part will become more apparent to those skilled in the art upon examination of the following or upon learning by practice thereof.

DETAILED DESCRIPTION

The present disclosure provides systems and methods for providing hardware level performance for process isolated containers executing on a virtual machine. The process isolated containers are be guest processes that operate on a host system (e.g., a server) for providing cloud services, web services, hardware as a service, or other network virtualization services. That is, the host system is physical computing hardware including one or more physical processors and physical memory that is configured to execute guest processes. In an implementation, the guest processes are controlled by customers of the host system provider.

Hardware virtualization allows a host system to support multiple guest processes. The guest processes are isolated using containers. A container is a virtualization of a machine. A relatively simple process isolated container is a process on the host system that is associated with a host virtual NIC (vNIC). Network isolation for the process isolated container is provided by assigning a dedicated Host vNIC to the process isolated container. In some cases, the isolation is augmented with compartments defining transport control protocol/internet protocol (TCPIP) settings (e.g., in a TCPIP.sys file). A virtual switch distributes data packets among multiple containers.

The use of a virtual switch adds a layer of overhead to the guest processes executing on the host system. Since the virtual switch is executed by the same processing resources that could otherwise execute the guest processes, the virtual switch consumes processing resources of the guest process. The virtual switch also contributes to network latency as packets are switched both by a physical NIC and the virtual switch.

In an aspect of the present disclosure, a server includes a physical network interface controller (NIC) that includes a physical NIC switch configured to distribute incoming data packets to a plurality of functions including physical functions and virtual functions. At least one of the virtual functions is assigned to the at least one process isolated container within the virtual machine. As such, the physical NIC switch performs hardware switching and controls to deliver hardware level access to the process isolated container. As such, traffic for the process isolated container may bypass the virtual switch of the virtual machine. Accordingly, the traffic does not incur latency due to the virtual switching protocol stack and the virtual switch does not consume processor cycles, which are then available for the container. Additionally, the virtual function provides hardware level access such that the process isolated container can perform direct memory access operations and hardware accelerations.

Figure 1:
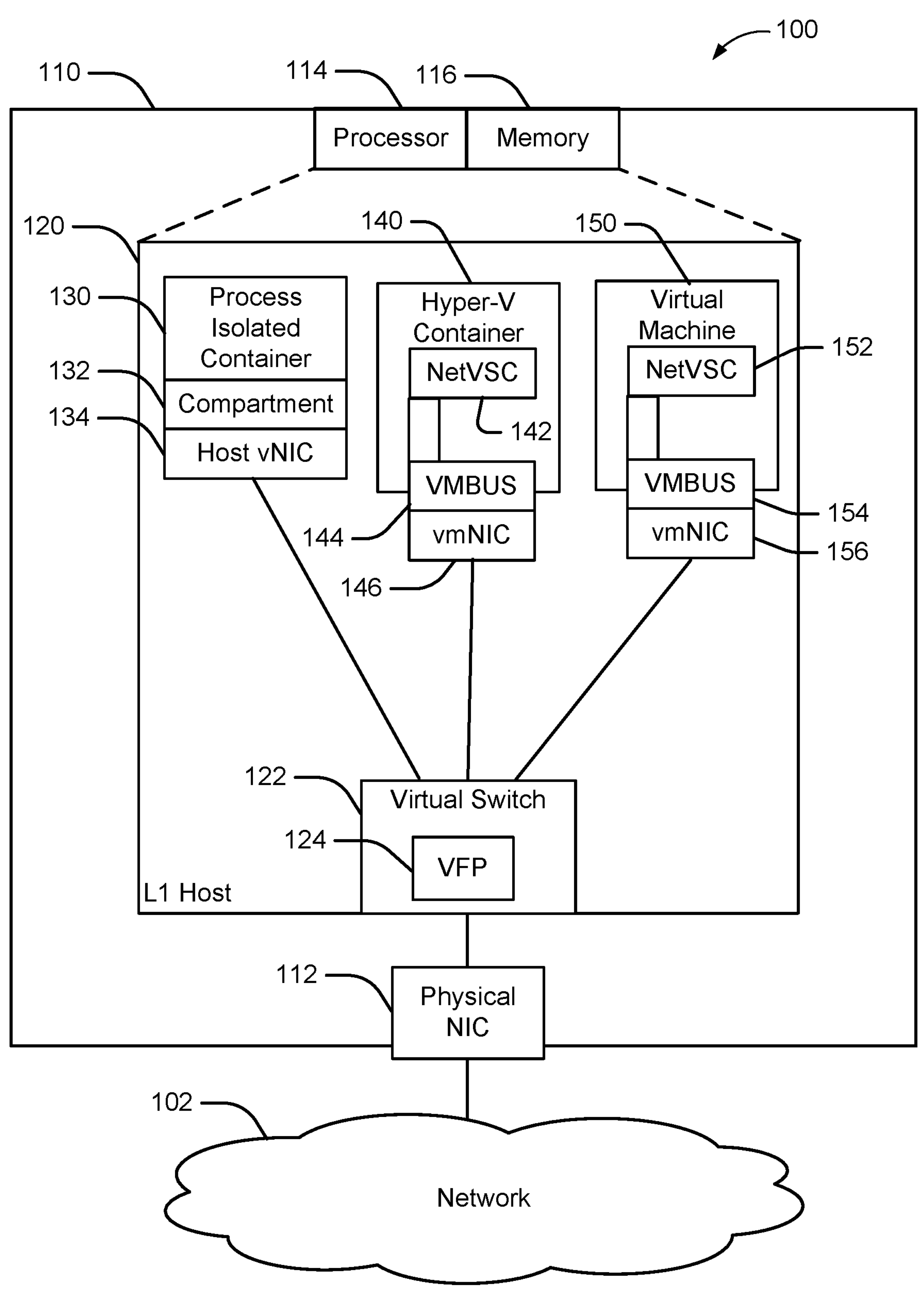
FIG. 1 is a schematic diagram of an example network architecture including containers.

Referring now to FIG. 1, an example host environment 100 includes a layer 1 host 120 executed on a physical host 110. The physical host 110 is connected to a network 102 (e.g., the Internet) via a physical NIC 112. The physical host 110 includes at least one physical processor 114 and a physical memory 116. The physical processor 114 and the physical memory 116 may be considered computing resources, which are be shared among multiple containers.

The physical host 110 includes, for example, any mobile or fixed computer device including but not limited to a computer server, desktop or laptop or tablet computer, a cellular telephone, a personal digital assistant (PDA), a handheld device, any other computer device having wired and/or wireless connection capability with one or more other devices, or any other type of computerized device capable of hosting a guest process.

The physical host 110 includes at least one physical processor 114 that executes instructions stored in memory 116. For example, the physical processor 114 executes one or more of an L1 host 120, which is an operating system for a virtualized device. That is, the L1 host 120 controls the processor 114 and memory 116, or a portion thereof. The physical NIC 112 routes network traffic to the L1 host 120.

Memory 116 is configured for storing data and/or computer-executable instructions defining and/or associated with the L1 host 120 and/or containers such as process isolated containers 130, kernel isolated containers 140, and virtual machines 150. Physical processor 114 executes the L1 host, the containers and/or applications within the containers. Memory 116 represents one or more hardware memory devices accessible to physical host 110. An example of memory 116 can include, but is not limited to, a type of memory usable by a computer, such as random access memory (RAM), read only memory (ROM), tapes, magnetic discs, optical discs, volatile memory, non-volatile memory, and any combination thereof. Memory 116 stores local versions of applications being executed by physical processor 114. In an implementation, the memory 116 includes a storage device, which includes a non-volatile memory.

The physical processor 114 include one or more processors for executing instructions. An example of physical processor 114 can include, but is not limited to, any processor specially programmed as described herein, including a controller, microcontroller, application specific integrated circuit (ASIC), field programmable gate array (FPGA), system on chip (SoC), or other programmable logic or state machine. In an implementation, the physical processor 114 includes other processing components such as an arithmetic logic unit (ALU), registers, and a control unit. The physical processor 114 can include multiple cores and may be able to process different sets of instructions and/or data concurrently using the multiple cores to execute multiple threads.

In an aspect, the L1 host 120 configures one or more containers for hosting guest processes. A container includes application code and operating system elements necessary for the application code. An example guest process is a website provided by an application within a container. The L1 host 120 hosts multiple containers. For example, the containers include process isolated containers 130, kernel isolated containers 140, and virtual machines 150. The L1 host 120 includes a virtual switch 122 for routing network traffic to individual containers. The virtual switch 122 includes instructions executed by the physical processor 114 that simulate a physical switch. That is, the virtual switch 122 distributes network traffic among the containers, for example, based on packet headers. The virtual switch 122 includes a virtual filter platform (VFP) 124. The VFP 124 applies policies and access control lists (ACLs) of the L2 host 120 to the network traffic. For example, the VFP 124 provides firewalling or control over what traffic is allowed to traverse the virtual switch 122. The VFP 124 also provides rate limiting to control how much network traffic is allowed to traverse the virtual switch 122. The VFP 124 enforces per tenant resource caps for the containers.

A process isolated container 130 provides application isolation through process and namespace isolation. A process isolated container 130 shares a kernel with the container host (e.g., L2 host 120) and all containers running on the host. A process isolated container 130 may not provide a hostile security boundary. Accordingly, the process isolated container 130 is suitable for trusted applications, but is not recommended to isolate untrusted code. Because of the shared kernel space, process isolated containers 130 require the same kernel version and configuration. Network access for a process isolated container 130 is provided by a host vNIC 134. The host vNIC 134 receives network traffic from the virtual switch 122. The process isolated container 130 also includes a compartment 132 to provide TCPIP.sys isolation. An example process isolated container is a Windows Server container or a Linux container (e.g., a Kata container).

A kernel isolated container 140 includes its own copy of an operating system kernel and has memory assigned directly to the kernel isolated container 140. A hypervisor provides CPU, memory and IO isolation (e.g., network and storage) for the kernel isolated container 140. Kernel isolated containers are also referred to as hypervisor isolated containers. Network access for the kernel isolated container 140 is provided by a virtual machine NIC (vmNIC) 146, a virtual machine bus (vmBUS) 144, and a network virtual service client device (netVSC) 142. An example kernel isolated container 140 is a Hyper-V container.

A virtual machine 150 does not exactly meet the definition of a container in that a virtual machine 150 includes a complete operating system. In terms of network access, however, a virtual machine 150 also receives network access via a vmNIC 156, a vmBUS 154, and a netVSC 152 provided by a hypervisor. Accordingly, from a networking perspective, a virtual machine is similar to a kernel isolated container. An example virtual machine includes a VMware virtual machine.

The host environment 100 provides advantages over hosting a guest application on a dedicated server. In particular, the host environment 100 allows multiple applications to be executed on the same physical hardware. The applications are isolated by the containers such that each application may act as if the application is the only application on the hardware. Further, because the applications are isolated within containers, the applications are portable between physical hardware. Additionally, the containers provide easy scalability by instantiating additional containers as needed.

The host environment 100, however, may experience various performance issues compared to a dedicated hardware server. For example, routing network traffic via the virtual switch 122 (such as for accessing data stored at remote databases) consumes resources of the physical processor 114 that could otherwise be used for the applications within the containers. Additionally, the routing via the virtual switch 122 is an additional hop for the network traffic adding latency. In an aspect, where the physical processor 114 is operating with few idle cycles (e.g., 70% busy), the virtual switch contributes to a long tail latency, where some packets wait for the virtual switch 122. Additionally, various hardware accelerations, direct memory access operations, and device memory-mapped input-output operations that are available on a dedicated server are not available within a container via the virtual switch 122.

One technique that can improve network latency in a virtualized network is input-output virtualization (IOV) Virtual Functions (VFs) or single root (SR) IOV. SR-IOV is an extension to the PCI Express (PCIe) specification that allows a device such as a network adaptor (e.g., NIC) to separate access to its resources among various PCIe hardware functions. The PCIe hardware functions include a PCIe Physical Function (PF) and one or more PCIe Virtual Functions (VFs). The PF is the primary function of the device and advertises the device's SR-IOV capabilities. The PF is associated with the Hyper-V parent partition in a virtualized environment. Each VF is associated with the PF. A VF shares one or more physical resources of the device, such as a memory (e.g., memory 116) and a network port, with the PF and other VFs on the device. Each VF is associated with a Hyper-V child partition in a virtualized environment. Each PF and VF is assigned a unique PCI Express Requester ID (RID) that allows an I/O memory management unit (IOMMU) to differentiate between different traffic streams and apply memory and interrupt translations between the PF and VFs. This allows traffic streams to be delivered directly to the appropriate Hyper-V parent or child partition. As a result, non-privileged data traffic flows from the PF to VF without affecting other VFs. SR-IOV enables network traffic to bypass the software switch layer of the Hyper-V virtualization stack. Because the VF is assigned to a child partition, the network traffic flows directly between the VF and child partition. As a result, the I/O overhead in the software emulation layer is diminished and achieves network performance that is nearly the same performance as in non-virtualized environments.

Figure 2:
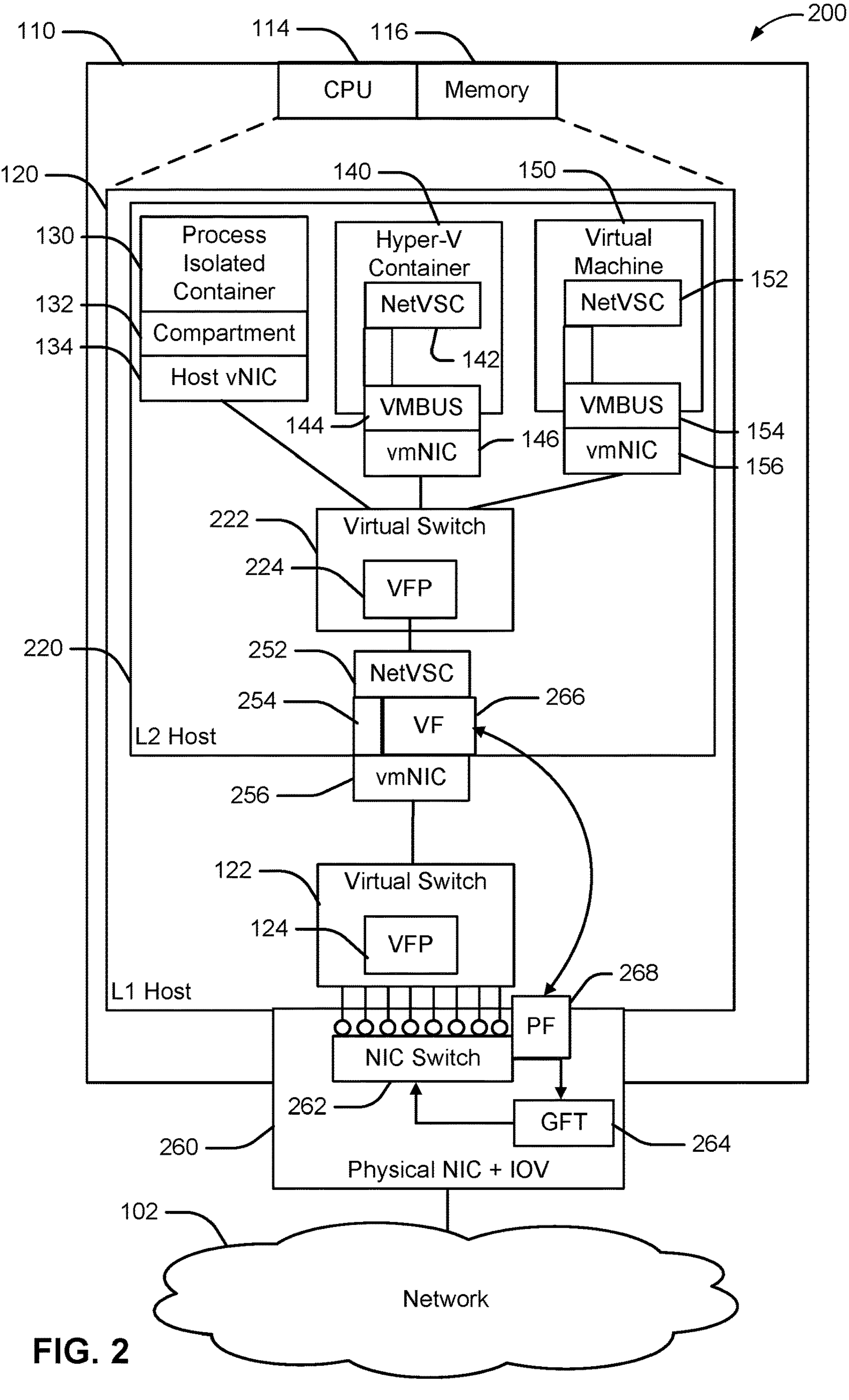
FIG. 2 is a schematic diagram of an example network architecture including containers nested within a virtual machine.

Referring to FIG. 2 an example multi-level host architecture 200 includes a layer 1 host 120 executed on a physical host 110 and a layer 2 host 220, which may be a virtual machine on the layer 1 host 120. As a virtual machine, the layer 2 host 220 includes a virtual machine NIC 256, vmBUS 254, and netVSC 252. For supporting containers, the layer 2 host 220 also includes a virtual switch 222 and a VFP 224. The multi-level host architecture 200 preserves a formally correct OSI Layer 2 network topology. The L1 Host 120 is analogous to an Aggregation Layer Switch. The L2 Host 220 is equivalent to a Top of Rack Switch (TOR). Lastly, a container is the endpoint, which is equivalent to a physical machine in a rack. The virtual switches 122, 222 effectively provide media access to the virtual and physical fabric for the container endpoints. This approach aids in compatibility, stability, diagnosis, and support. While many non-standard combinations are possible for performance reasons, correctness is a desirable quality to preserve a maintainable and extensible architecture with manageable test/validation costs.

The guest datapath in the multi-level host architecture 200 is augmented with SR-IOV including a PF 268 and VFs 266. For example, a physical NIC 260 implements SR-IOV. The physical NIC 260 includes a NIC switch 262 that distributes network traffic to VFs 266. For example, a VF 266 is assigned to the L2 host 220. The physical NIC 260 identifies traffic for the VF 266 and routes/copies data packets for the VF 266 directly to a memory assigned to the VF 266. Accordingly, the VF 266 allows traffic for the L2 host 220 to bypass the virtual switch 122.

However, since VFs bypass host mediated IO (e.g., the VFP 224 in the virtual switch 222), the host policies and ACLs will not apply for VF traffic. To secure VF traffic, the policies, rates, and resource caps are enforced through hardware mechanisms, which are implemented in the physical NIC 260 that includes IOV functionality.

The physical NIC 260 can perform firewalling and control what is placed on a fabric (e.g., NIC switch 262) via Generic Flow Tables (GFT) 264. The GFT 264 allows VFP 124 in virtual switch 122 to offload Policies/ACLs to the physical NIC 260 for controlling what the VF places on the fabric. The physical NIC 260 performs rate limiting of how much traffic is placed on the fabric. The NIC switch 262 performs hardware quality of service (QoS) that enables the ability to rate-limit traffic via send caps or reservation and receive caps on a per IEEE 802.1p, IP differentiated services code point (DSCP). Additionally, a Guest data center bridging (DCB) feature allows for last hop IEEE 802.1p and IP DSCP priority sanitization, as well as classification per stateful offloads such as remote direct memory access (RDMA). The classification is extensible to Internet Small Computer Systems Interface (iSCSI), Fibre Channel over Ethernet (FCoE), and similar stateful offloads. The physical NIC 260 enforces per tenant resource caps. Resource management encompasses host side control of how many physical NIC resources each VF is allowed to consume. Thus preventing noisy neighbor scenarios where a misbehaving VF drains all injectors or queueing points (QPs) or similar resources from the physical NIC 260, leaving other virtual machines unable to use NIC accelerations.

Figure 3:
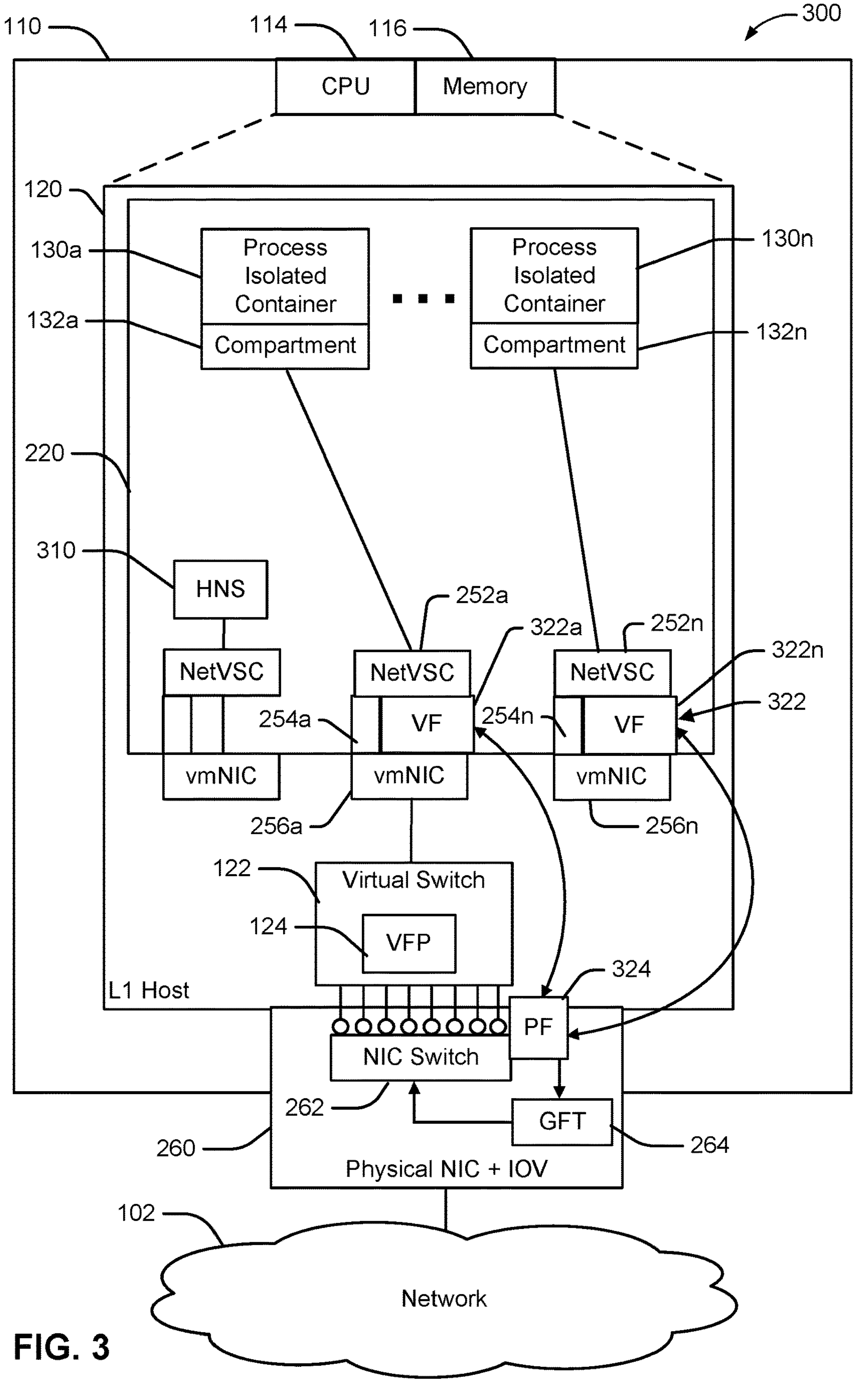
FIG. 3 is a schematic diagram of an example network architecture including containers nested within a virtual machine and assigned a virtual function for hardware access, in accordance with an implementation of the present disclosure.

Referring to FIG. 3 an example multi-level host architecture 300 includes a layer 1 host 120 executed on a physical host 110 and a layer 2 host 220, which is a virtual machine on the layer 1 host 120. The multi-level host architecture 300 includes multiple process isolated containers 130*a* . . . 130*n* hosted on the L2 host 220. The process isolated containers 130*a* . . . 130*n* each include a respective compartment 132*a* . . . 132*n* to provide TCPIP.sys isolation. The multi-level host architecture 300 provides the process isolated containers 130*a* . . . 130*n* with hardware level access by assigning a respective VF 322*a* . . . 322*n* of the physical NIC

260 to each individual process isolated container 130. The physical NIC 260 includes the physical function 324. The L1 host assigns multiple vmNICS 256*a* . . . 256*n* (e.g., up to 64) to the L2 Host 220. Each of the vmNICs 256*a* . . . 256*n* can be augmented with the respective VF 322*a* . . . 322*n* for near-native hardware access for the corresponding process isolated container 130*a* . . . 130*n*. The view of the L2 Host 220 of the vmNICs 256*a* . . . 256*n* is via a respective NetVSC device 252*a* . . . 252*n*. The NetVSC device 252*a* . . . 252*n* is mapped to a process isolated container 130*a* . . . 130*n* by host network services (HNS) 310. A synthetic data path utilizing the virtual switch 122 includes a vmBUS 254*a* . . . 254*n* to each NetVSC device 252*a* . . . 252*n*. In comparison to the example architecture in FIG. 1, the host vNIC 134 is replaced with the vmNIC 256*a* in a similar pattern to how host vNICs 134 on the virtual switch 122 are assigned to containers.

The HNS 310 includes an application programming interface (API) that can be accessed by a process isolated container 130 or L2 Host 220 to program address translation modes to apply to each combination of VF 322 and NetVSC 252 via L1 Host 120. For example, the API allows the L2 host 220 to request the GFT 264 to enforce of transpositions for {Bridge, Overlay, NAT} by the L1 Host 120 on each VF 322. As another example, the API allows the L2 host 220 to configure the GFT 264 for rate limiting via hardware QoS by the NIC switch 262.

The L1 host 120 also includes an API for programming the VFP 124 with requests from the L2 host 220. As previously discussed, the SR-IOT includes the VFP 124 offloading Policies/ACLs to the GFT 264 of the physical NIC 260 for controlling what the VF places on the fabric. Accordingly, by allowing the L2 host 220 to program the VFP, the policies/ACLs are loaded to the physical NIC 260 for implementing the VFs 266.

The architecture 300 preserves the dual-ported synthetic and VF datapath semantics, enabling advanced accelerations such as data plane development kit (DPDK), remote direct memory access (RDMA), and access to physical memory (PMEM) for a Guest within a process isolated container. Additionally, because the L2 host is a virtual machine including containers, the architecture 300 is live migration capable for the L2 Host 220. That is, the L2 host may be moved to another physical host 110.

Figure 4:
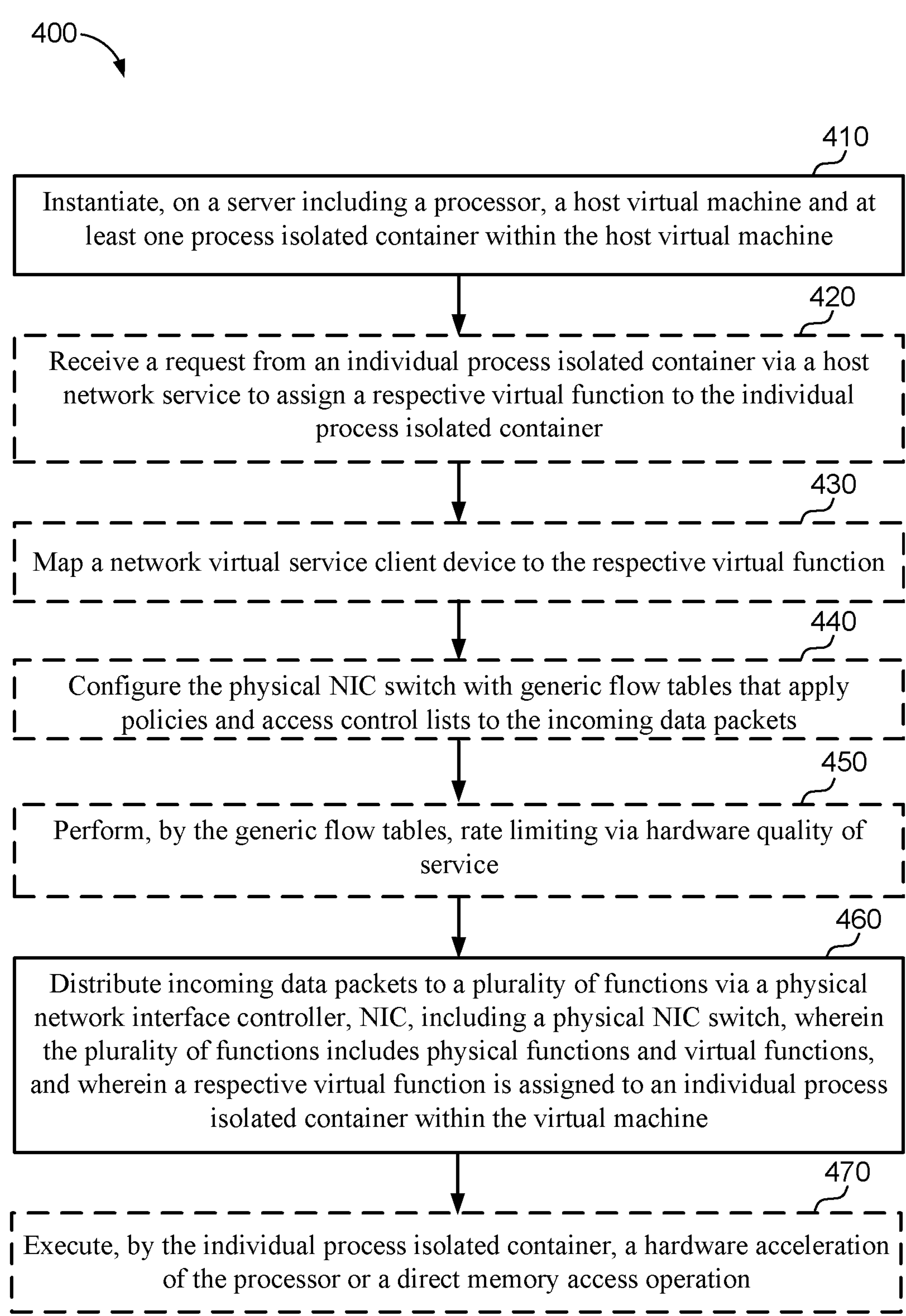
FIG. 4 is a flowchart of an example method of hosting process isolated containers, in accordance with an implementation of the present disclosure.

Turning to FIG. 4, an example method 400 hosts process isolated containers within a virtual machine. For example, method 400 can be performed by the host architecture 300 on the physical host 110.

At block 410, the method 400 includes instantiating, on a server including a processor, a host virtual machine and at least one process isolated container within the host virtual machine. For example, the host architecture 300 or L1 host 120 instantiates, on a server (e.g., physical host 110) including a processor 114, a host virtual machine (e.g., L2 host 220) and at least one process isolated container 130 within the L2 host 220. For instance, the L1 host 120 loads the code defining the L2 host 220 into memory 116 and executes the code. The L2 host 220 similarly loads the code defining each process isolated container into the virtual memory of the virtual machine for execution on a virtual processor. Accordingly, the host virtual machine and each process isolated container is resident in the memory 116 or in virtual memory.

At block 420, the method 400 optionally includes receiving a request from an individual process isolated container via a host network service to assign a respective virtual function to the individual process isolated container. In an implementation, for example, the L1 host 120 receives a request from the individual process isolated container (e.g., process isolated container 130*a*) via the HNS 310 to assign a VF 322 to the process isolated container 130*a*. For example, the process isolated container 130*a* calls an API of the HNS 310 to request the VF 322.

At block 430, the method 400 optionally includes mapping a network virtual service client device to the respective virtual function. In an aspect, for example, the HNS 310 maps the NetVSC 252*a* to the VF 322*a*. The VF 322*a* corresponds to the individual process isolated container 130*a*. In response to receiving the request from the individual process isolated container 130*a* in block 420, the HNS 310 instantiates the NetVSC 252*a* and assigns the NetVSC 252*a* to the VF 322*a*.

At block 440, the method 400 optionally includes configuring a physical NIC switch with generic flow tables that apply policies and access control lists to incoming data packets. For instance, the virtual switch 122 of the L1 host 120 configures the physical NIC switch 262 with GFT 264 that applies policies and access control lists to the incoming data packets. For example, the L1 host 120 or the virtual switch 122 includes an API that allows the L2 host 220 to program the VFP 124 with the policies and access control lists. The virtual switch 122 offloads or exports the policies and access control lists of the VFP 124 to the GFT 264.

At block 450, the method 400 optionally includes performing, by the generic flow tables, rate limiting via hardware quality of service. In an aspect, for example the GFT 264 performs rate limiting via hardware quality of service. For example, the GFT 264 controls the NIC switch 262 to implement hardware QoS rules. For example, the NIC switch 262 queues packets and services the queues to satisfy the QoS rules.

At block 460, the method 400 includes distributing incoming data packets to a plurality of functions via a physical network interface controller, NIC, including a physical NIC switch. The plurality of functions includes a physical function and virtual functions. At least one of the virtual functions is assigned to the at least one process isolated container within the virtual machine. In an implementation, the physical NIC 260 including the physical NIC switch 262 distributes the incoming data packets to the plurality of functions. The plurality of functions includes a physical function 324 and VFs 322. At least one of the VFs 322 is assigned to the at least one process isolated container 130 within the L2 host 220. The physical NIC switch 262 uses the GFT 264 to route each packet to the correct VF 322. For example, the NIC switch 262 compares an IP address of the packet to the GFT 264 to determine the correct VF 322. The NIC switch 262 stores the packet in a memory associated with the correct VF 322.

At block 470, the method 400 includes executing, by the at least one process isolated container, a hardware acceleration of the processor or a direct memory access operation. In an implementation, for example, the at least one process isolated container 130 executes the hardware acceleration of the processor 114 or a direct memory access operation on the memory 116. The process isolated container 130 accesses the processor 114 or the memory 116 via the VF 322. For instance, the hardware acceleration of the processor or the direct memory access may include a data plane development kit operation, a remote direct memory access operation, or access to physical memory by the process isolated container. In an example, the hardware acceleration performs TCPIP processing in hardware.

Figure 5:
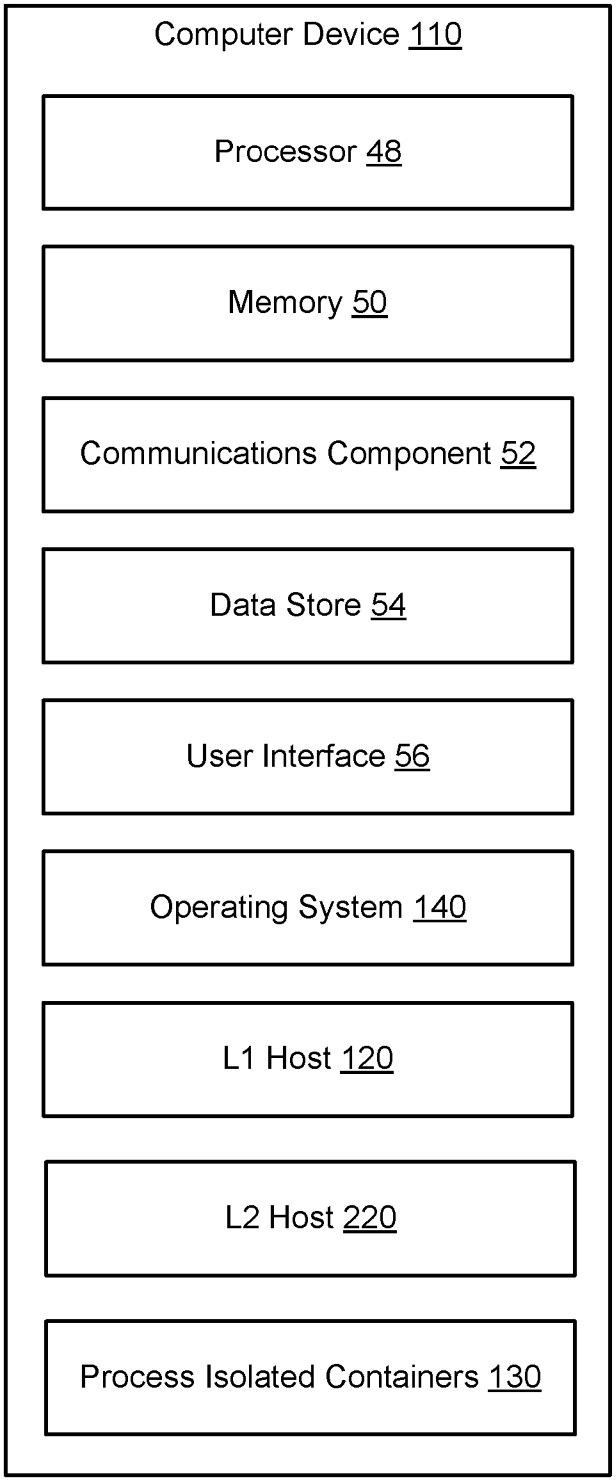
FIG. 5 is a schematic block diagram of an example computer device, in accordance with an implementation of the present disclosure.

Referring now to FIG. 5, illustrated is an example physical host 110 in accordance with an implementation, including additional component details as compared to FIG. 1. In one example, physical host 110 includes processor 48 for carrying out processing functions associated with one or more of components and functions described herein. Processor 48 can include a single or multiple set of processors or multi-core processors. Moreover, processor 48 can be implemented as an integrated processing system and/or a distributed processing system. In an implementation, for example, processor 48 includes the physical processor 114.

In an example, physical host 110 includes memory 50 for storing instructions executable by the processor 48 for carrying out the functions described herein. In an implementation, for example, memory 50 includes memory 116. The memory 50 includes instructions for executing the L1 host 120, L2 host 220, and any containers within the L2 host 220.

Further, physical host 110 include a communications component 52 that provides for establishing and maintaining communications with one or more parties utilizing hardware, software, and services as described herein. Communications component 52 carries communications between components on physical host 110, as well as between physical host 110 and external devices, such as devices located across a communications network and/or devices serially or locally connected to physical host 110. For example, communications component 52 includes one or more buses, and may further include transmit chain components and receive chain components associated with a transmitter and receiver, respectively, operable for interfacing with external devices.

Additionally, physical host 110 includes a data store 54, which can be any suitable combination of hardware and/or software, that provides for mass storage of information, databases, and programs employed in connection with implementations described herein. For example, data store 54 can be a data repository for L1 host 120, L2 host 220, and/or containers. The data store includes memory 116 and/or a storage device.

Physical host 110 also includes a user interface component 56 operable to receive inputs from a user of physical host 110 and further operable to generate outputs for presentation to the user. User interface component 56 includes one or more input devices, including but not limited to a keyboard, a number pad, a mouse, a touch-sensitive display, a digitizer, a navigation key, a function key, a microphone, a voice recognition component, any other mechanism capable of receiving an input from a user, or any combination thereof. Further, user interface component 56 includes one or more output devices, including but not limited to a display, a speaker, a haptic feedback mechanism, a printer, any other mechanism capable of presenting an output to a user, or any combination thereof.

In an implementation, user interface component 56 transmits and/or receives messages corresponding to the operation of L1 host 120, L2 host 220, and/or containers. In addition, processor 48 executes L1 host 120, L2 host 220, and/or containers, and memory 50 or data store 54 stores them.

As used in this application, the terms "component," "system" and the like are intended to include a computer-related entity, such as but not limited to hardware, firmware, a combination of hardware and software, software, or software in execution. For example, a component includes, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. A person skilled in the art should understand and appreciate that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or procedure described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or procedure may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

SOME FURTHER EXAMPLE IMPLEMENTATIONS

An example server for hosting process isolated containers within a virtual machine, comprising: at least one physical processor; at least one physical computer memory storing executable code for execution by the at least one physical processor, the executable code configured to provide a host virtual machine and at least one process isolated container within the host virtual machine; and a physical network interface controller, NIC, including a physical NIC switch configured to distribute incoming data packets to a plurality of functions, wherein the plurality of functions includes a physical function and virtual functions, a respective function of the virtual functions assigned to an individual process isolated container within the virtual machine. The virtual function assigned to the process isolated container allows the physical NIC switch to distribute incoming data packets for the process isolated container to a portion of the memory for the process isolated container at a hardware level, which is faster than routing the data packet through a virtual switch since compute cycles of a virtual switch are not introduced. Accordingly, the server has lower latency than a server without a virtual function assigned to a process isolated container.

The above example server, wherein a host network service of the host virtual machine is configured to assign the respective virtual function to the individual process isolated container. The host network service can configure the virtual function for the individual process isolated container based on a policy previously obtained related to the process isolated container.

The above example server, wherein the individual process isolated container is configured to communicate with the host virtual machine via a host network service to assign the virtual functions to the individual process isolated container. Accordingly, the host network service allows the process isolated container to request a virtual function for hardware level access.

The above example server, wherein the host network service is configured to configure the physical NIC switch with generic flow tables that apply policies and access control lists to the incoming data packets. The generic flow tables implement the policies and access control lists at the hardware level on the physical NIC switch, thereby performing the policy control faster and eliminating tasks performed by a software switch.

The above example server, wherein the generic flow tables are configured to perform rate limiting via hardware quality of service. By implementing rate limiting using hardware quality of service, the server performs load balancing between virtual functions and/or containers.

Any of the above example servers, wherein the host network service is configured to map a network virtual service client device to the respective virtual function. The network virtual service client allows the individual process isolated container to access the respective virtual function.

Any of the above example servers, wherein the at least one process isolated container is configured to execute a hardware acceleration of the physical processor or perform a direct memory access on the physical memory via the virtual function. The hardware acceleration or direct memory access provides improved performance (e.g., lower latency) than performing the same operation on a virtual machine.

Any of the above example servers, wherein each process isolated container is associated with a compartment that is configured to isolate each process isolated container from other ones of the at least one process isolated container. The compartment provides an additional degree of isolation between containers.

Any of the above example servers, such that the individual process isolated container is able to access hardware accelerations or direct memory access via the respective virtual function without the need for a virtual switch in the virtual machine. By eliminating or bypassing the virtual switch, the virtual function reduces workload of the physical processor and latency for the individual process isolated container.

An example method of hosting process isolated containers within a virtual machine, comprising: instantiating, on a server including a processor, a host virtual machine and at least one process isolated container within the host virtual machine; and distributing incoming data packets to a plurality of functions via a physical network interface controller, NIC, including a physical NIC switch, wherein the plurality of functions includes a physical function and virtual functions, and wherein a respective virtual function of the virtual functions is assigned to an individual process isolated container within the virtual machine.

The above example method, further comprising assigning, by a host network service of the host virtual machine, the respective virtual function to the individual process isolated container.

The above example method, further comprising receiving a request from the individual process isolated container via a host network service to assign the respective virtual function to the individual process isolated container.

The above example method, further comprising configuring the physical NIC switch with generic flow tables that apply policies and access control lists to the incoming data packets.

The above example method, further comprising performing, by the generic flow tables, rate limiting via hardware quality of service.

Any of the above example methods, further comprising mapping a network virtual service client device to the respective virtual function.

Any of the above example methods, further comprising executing, by the at least one process isolated container, a hardware acceleration of the processor, wherein the hardware acceleration is one of: a data plane development kit operation; a remote direct memory access operation; or access to physical memory by the process isolated container.

The above example method, wherein the hardware acceleration is one of: a data plane development kit operation; a remote direct memory access operation; or access to physical memory by the process isolated container.

An example non-transitory computer-readable medium storing computer executable instructions for performing any of the above example methods.

What is claimed is:

1. A server for hosting process isolated containers within a virtual machine, comprising:

at least one physical processor;

at least one physical computer memory storing executable code for execution by the at least one physical processor, the executable code configured to provide a host virtual machine and a plurality of process isolated containers within the host virtual machine, wherein each of the plurality of process isolated containers includes a respective transport control protocol/internet protocol (TCPIP) file that defines TCPIP settings enabling isolated TCPIP processing for the process isolated container; and a physical network interface controller (NIC) including a physical NIC switch configured to distribute incoming data packets, via a physical function, to a plurality of virtual functions, wherein a respective virtual function is assigned to the process isolated container of the plurality of process isolated containers within the host virtual machine thereby bypassing a virtual switch and enabling hardware acceleration for the isolated TCPIP processing via access to the at least one physical processor and based on the TCPIP settings defined via the respective TCPIP file included in the process isolated container.

2. The server of claim 1, wherein the respective virtual function assigned to the process isolated container is configured to access a portion of the at least one physical computer memory allocated to the process isolated container to bypass the virtual switch.

3. The server of claim 1, wherein a host network service of the host virtual machine is configured to assign the respective virtual function to the process isolated container.

4. The server of claim 3, wherein the process isolated container is configured to communicate with the host virtual machine via the host network service to request the respective virtual function.

5. The server of claim 3, wherein the host network service configures the physical NIC switch with generic flow tables that apply policies and access control lists to the incoming data packets, wherein the generic flow tables are configured to perform rate limiting on the physical NIC switch via hardware quality of service.

6. The server of claim 3, wherein the host network service is configured to map a network virtual service client device to the respective virtual function for the process isolated container.

7. The server of claim 1, wherein the hardware acceleration is executed via a data plane development kit operation.

8. A method of hosting a plurality of process isolated containers within a host virtual machine, comprising:

instantiating, on a server including a processor, a host virtual machine and the plurality of process isolated containers within the host virtual machine, wherein each of the plurality of process isolated containers includes defined transport control protocol/internet protocol (TCPIP) settings enabling isolated TCPIP processing; and distributing, via a physical function of a physical network interface controller (NIC) including a physical NIC switch, incoming data packets to a plurality of virtual functions, wherein a respective virtual function is assigned to a process isolated container of the plurality of process isolated containers within the host virtual machine thereby bypassing a virtual switch and enabling hardware acceleration for the isolated TCPIP processing via access to the processor and based on the defined TCPIP settings.

9. The method of claim 8, further comprising assigning, by a host network service of the host virtual machine, the respective virtual function to the process isolated container.

10. The method of claim 9, further comprising:

configuring the physical NIC switch with generic flow tables that apply policies and access control lists to the incoming data packets; and performing, by the generic flow tables, rate limiting via hardware quality of service.

11. The method of claim 8, further comprising mapping a network virtual service client device to the respective virtual function.

12. The method of claim 8, further comprising executing, by the process isolated container, the hardware acceleration with respect to the processor via the respective virtual function, wherein the hardware acceleration comprises a data plane development kit operation.

13. The method of claim 8, further comprising respectively assigning a plurality of host virtual network interface controllers to the plurality of process isolated containers, wherein a respective host virtual network interface controller is augmented with the respective virtual function.

14. A non-transitory computer-readable medium storing computer-executable instructions, that when executed by a processor of a server cause the server to:

instantiate, on the server, a host virtual machine and a plurality of process isolated containers within the host virtual machine, wherein each of the plurality of process isolated containers includes defined transport control protocol/internet protocol (TCPIP) settings enabling isolated TCPIP processing; and distribute, via a physical function of a physical network interface controller (NIC) including a physical NIC switch, incoming data packets to a plurality of virtual functions, wherein a respective virtual function is assigned to a process isolated container of the plurality of process isolated containers within the host virtual machine thereby bypassing a virtual switch and enabling hardware acceleration for the isolated TCPIP processing via access to the processor and based on the defined TCPIP settings defined.

15. The non-transitory computer-readable medium of claim 14, wherein the computer-executable instructions further cause the server to assign, by a host network service of the host virtual machine, the respective virtual function to the process isolated container.

16. The non-transitory computer-readable medium of claim 15, wherein the computer-executable instructions further cause the server to:

configure the physical NIC switch with generic flow tables that apply policies and access control lists to the incoming data packets; and perform, by the generic flow tables, rate limiting via hardware quality of service.

17. The non-transitory computer-readable medium of claim 14, wherein the computer-executable instructions further cause the server to execute, by the process isolated container, a hardware acceleration with respect to the processor via the respective virtual function, wherein the hardware acceleration comprises a data plane development kit operation.

* * * * *